US005582207A

United States Patent [19]
Gilbert et al.

[11] Patent Number: 5,582,207
[45] Date of Patent: Dec. 10, 1996

[54] STEERING CONTROL VALVE WITH FLOW GAPS WHICH CHANGE RELATIVE SIZE FOR NOISE SUPPRESSION

[75] Inventors: Wendell L. Gilbert, Pleasant Shade; Lisa R. Menyhart, Murfreesboro, both of Tenn.

[73] Assignee: TRW Inc., Lyndhurst, Ohio

[21] Appl. No.: 403,488

[22] Filed: Mar. 14, 1995

[51] Int. Cl.[6] .................................................. F15B 13/04
[52] U.S. Cl. .................... 137/625.23; 91/375 A; 137/625.24
[58] Field of Search .................. 91/375 A; 137/625.23, 137/625.24

[56] References Cited

U.S. PATENT DOCUMENTS

| 5,207,244 | 5/1993 | Behrens et al. | |
|---|---|---|---|
| 5,259,413 | 11/1993 | Harpole et al. | |
| 5,263,512 | 11/1993 | Emori et al. | 137/625.23 |
| 5,417,244 | 5/1995 | Behrens et al. | 91/375 A X |

FOREIGN PATENT DOCUMENTS 59-58278  4/1984  Japan ................................ 137/625.23

*Primary Examiner*—Gerald A. Michalsky
*Attorney, Agent, or Firm*—Tarolli, Sundheim, Covell, Tummino & Szabo

[57] ABSTRACT

A valve (10) for controlling flow of hydraulic fluid. The valve (10) includes first and second valve members (80, 82), each having a plurality of lands and grooves. The valve members (80, 82) are relatively movable from a neutral position to a displaced position in which surface segments (202, 226, 208, 218) of respective pairs of lands overlap to form flow gaps (232, 234) for restricting flow of fluid between respective pairs of grooves. At least one (234) of the flow gaps is divergent by having a cross-sectional flow area which increases along a direction of fluid flow therethrough and at least one (232) of the flow gaps is convergent by having a cross-sectional flow area which decreases along a direction of fluid flow therethrough. The flow gaps (232, 234) have minimum cross-sectional flow areas (A, B) defined by the surface segments. The flow gaps (232, 234) are sized such that the minimum cross-sectional area (A) of the convergent flow gap (232) is larger than the minimum cross-sectional area (B) of the divergent flow gap (234) at a first rotational position, and are sized such that the minimum cross-sectional area (A) of the convergent flow gap (232) is smaller than the minimum cross-sectional area (B) of the divergent flow gap (234) at a second rotational position for suppressing valve noise.

35 Claims, 5 Drawing Sheets

STEERING CONTROL VALVE WITH FLOW GAPS WHICH CHANGE RELATIVE SIZE FOR NOISE SUPPRESSION

BACKGROUND OF THE INVENTION

The present invention relates to a valve for controlling flow of hydraulic fluid, and particularly relates to a power steering control valve for controlling the flow of hydraulic fluid from a pump to a power steering motor.

A known power steering control valve for controlling flow of hydraulic fluid from a pump to a power steering motor includes a valve sleeve having a generally cylindrical bore and a generally cylindrical valve core rotatably mounted in the bore in the valve sleeve. Each of the core and sleeve has a plurality of lands and grooves that cooperate to regulate fluid pressure within the valve and control flow from the pump to the power steering motor.

When the valve core and valve sleeve are in a neutral position, fluid is communicated generally equally to opposite chambers of the power steering motor. When the core and sleeve are relatively rotated from the neutral position, fluid communication with the opposite chambers is variably restricted. Restriction of the fluid communication causes pressurized fluid to be delivered to one of the chambers of the power steering motor to cause motor actuation.

The restriction is provided by the lands on the core and sleeve which define flow orifices of variable size. Relative rotation between the core and the sleeve varies the size of the flow orifices. Upon relative rotation from the neutral position to a displaced position, certain pairs of lands on the core and sleeve radially overlap to restrict the associated flow orifice to the size of a gap between end face surfaces of the respective pairs of lands. Due to a high volume of hydraulic fluid flow from the pump through the flow orifices and pressure changes, noise is generated. The noise includes noise due to cavitation of hydraulic fluid flowing through the flow orifices.

SUMMARY OF THE INVENTION

The present invention is directed to an improved valve for controlling flow of hydraulic fluid. An inlet port means of the valve is for connection with a fluid supply, and a return port means is for connection with a fluid reservoir. First and second device port means are for connection with first and second locations in a fluid utilization device, respectively.

The valve includes first and second relatively movable valve members. Each valve member has a plurality of lands and grooves. Respective pairs of lands on the valve members have surface segments which overlap to form flow gaps for restricting flow of fluid between respective pairs of grooves at relative positions of the valve members. The flow gaps include first and second flow gaps. In a preferred embodiment, one of the first and second flow gaps is located between a groove in direct fluid communication with the inlet port and a groove in direct fluid communication with the first device port means. The other of the first and second flow gaps is located between a groove in direct fluid communication with the second device port means and a groove in direct fluid communication with the return port means. In the preferred embodiment, at least one of the flow gaps is divergent by having a cross-sectional flow area which increases along the direction of fluid flow therethrough. Also, in the preferred embodiment, at least one of said flow gaps is convergent by having a cross-sectional flow area which decreases along the direction of fluid flow therethrough.

In the preferred embodiment, a percentage of the fluid flow flowing through the first and second flow gaps which flows through the first flow gap at a first relative position of the valve members is greater than a percentage of the fluid flow flowing through the first flow gap at a second relative position of the valve members. Each flow gap has a minimum cross-sectional flow area which is defined by the surface segments. The minimum cross-sectional flow area of the first flow gap is larger than the minimum cross-sectional flow area of the second flow gap at the first relative position of the valve members. In the preferred embodiment, the minimum cross-sectional flow area of the first flow gap is smaller than the minimum cross-sectional flow area of the second flow gap at the second relative position of the valve members. Specifically, the surface segments are contoured such that the fluid flow through the first flow gap is greater than the fluid flow through the second gap at the first relative position of the valve members. Further, the fluid flow through the first flow gap is less than the fluid flow through the second gap at the second relative position of the valve members. This suppresses valve noise. In the preferred embodiment, the first and second flow gaps are the convergent and divergent flow gaps, respectively.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
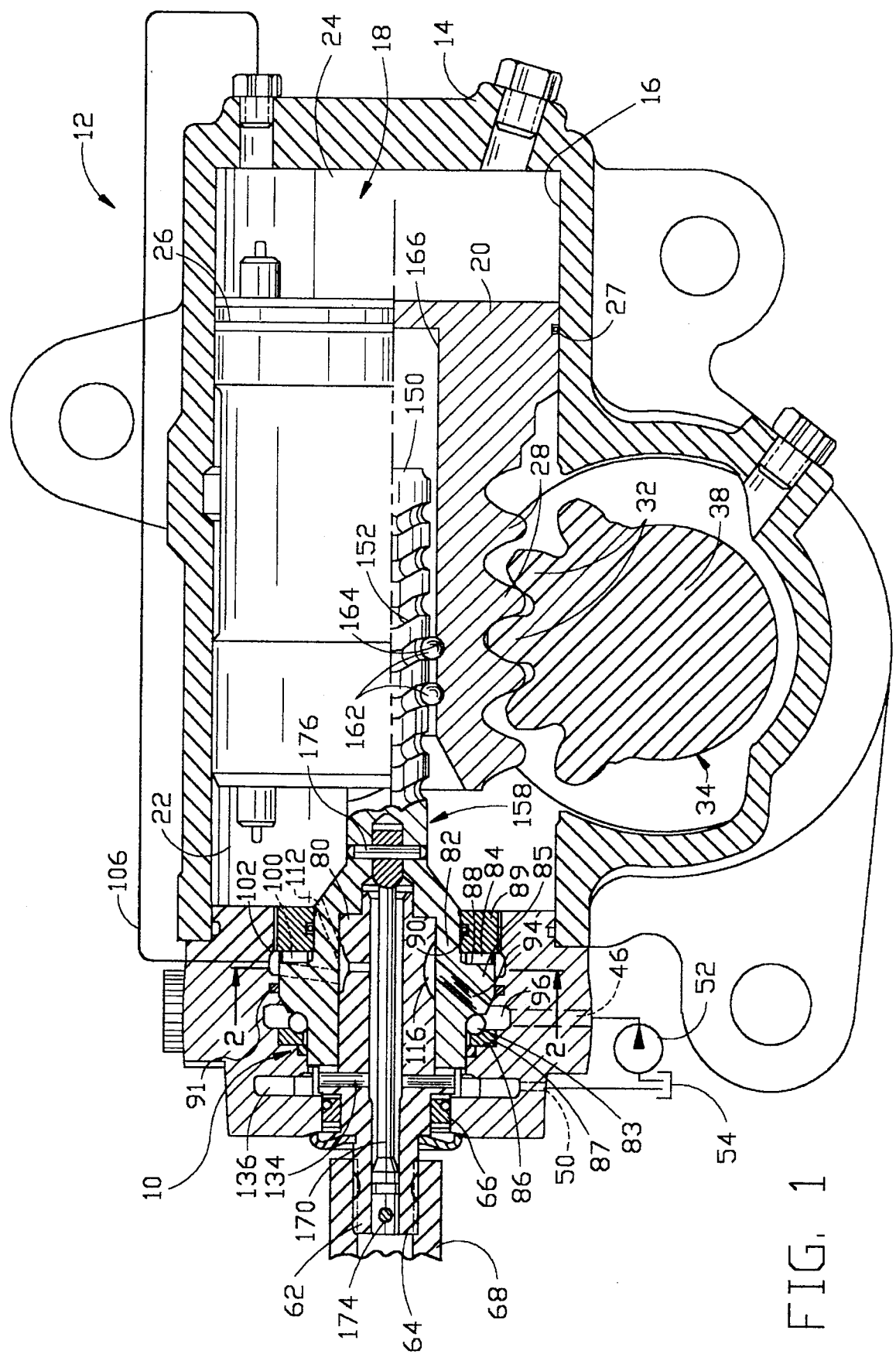
FIG. 1 is a longitudinal cross-sectional view of a power steering gear with a valve which embodies the present invention.

A fluid control valve of the present invention may be used to control fluid flow associated with mechanisms of a variety of constructions and uses. Preferably, the control valve 10 (FIG. 1) is utilized in a power steering gear 12 which provides power assistance for turning dirigible wheels (not shown) of a vehicle (not shown) in opposite directions to effect steering of the vehicle. The preferred power steering gear is a model TAS Integral Power Steering Gear manufactured and marketed by TRW Inc., Commercial Steering Division of Lafayette, Indiana, and identified as TAS40, TAS55 or TAS65. The power steering gear 12 includes a housing 14 having an inner cylindrical surface 16 defining a chamber 18. A piston 20 (shown partially in section) divides the chamber 18 into opposite chamber portions 22 and 24 located at opposite ends of the piston 20. An O-ring 26 carried in a groove 27 in the piston 20 provides a fluid seal between the chamber portions 22 and 24.

A series of rack teeth 28 are formed on the periphery of the piston 20. The rack teeth 28 mesh with teeth 32 formed on a sector gear 34. The sector gear 34 is fixed on an output shaft 38 which extends outwardly from the steering gear 12 through an opening (not shown) in the housing 14. The output shaft 38 is typically connected to a pitman arm (not shown) which in turn is connected to a mechanical steering linkage (not shown) of the vehicle. Thus, as the piston 20 moves in the chamber 18, the sector gear 34 and output shaft 38 are rotated to operate the steering linkage as will be understood by those skilled in the art.

The housing 14 includes a fluid inlet port 46 and a fluid return port 50. The inlet port 46 and the return port 50 are adapted to be connected in fluid communication with hydraulic circuitry (schematically illustrated) including a power steering pump 52 which supplies pressurized hydraulic fluid and a fluid reservoir 54. The control valve 10 is operable to direct pressurized fluid from the inlet port 46 to one of the chamber portions 22 and 24. Fluid from the other of the chamber portions 22 and 24 is simultaneously directed by the control valve 10 to the return port 50 which is connected with the fluid reservoir 54.

The control valve 10 is actuated by a rotatable shaft 62. The shaft 62 is supported for rotation relative to the housing 14 via a bearing member 66. An outer end portion 64 of the shaft 62 is splined for receiving a portion of a shaft 68 thereon. The shaft 68 is connected with a steering wheel (not shown) which is manually turned by the operator of the vehicle to effect steering of the vehicle.

Figure 2:
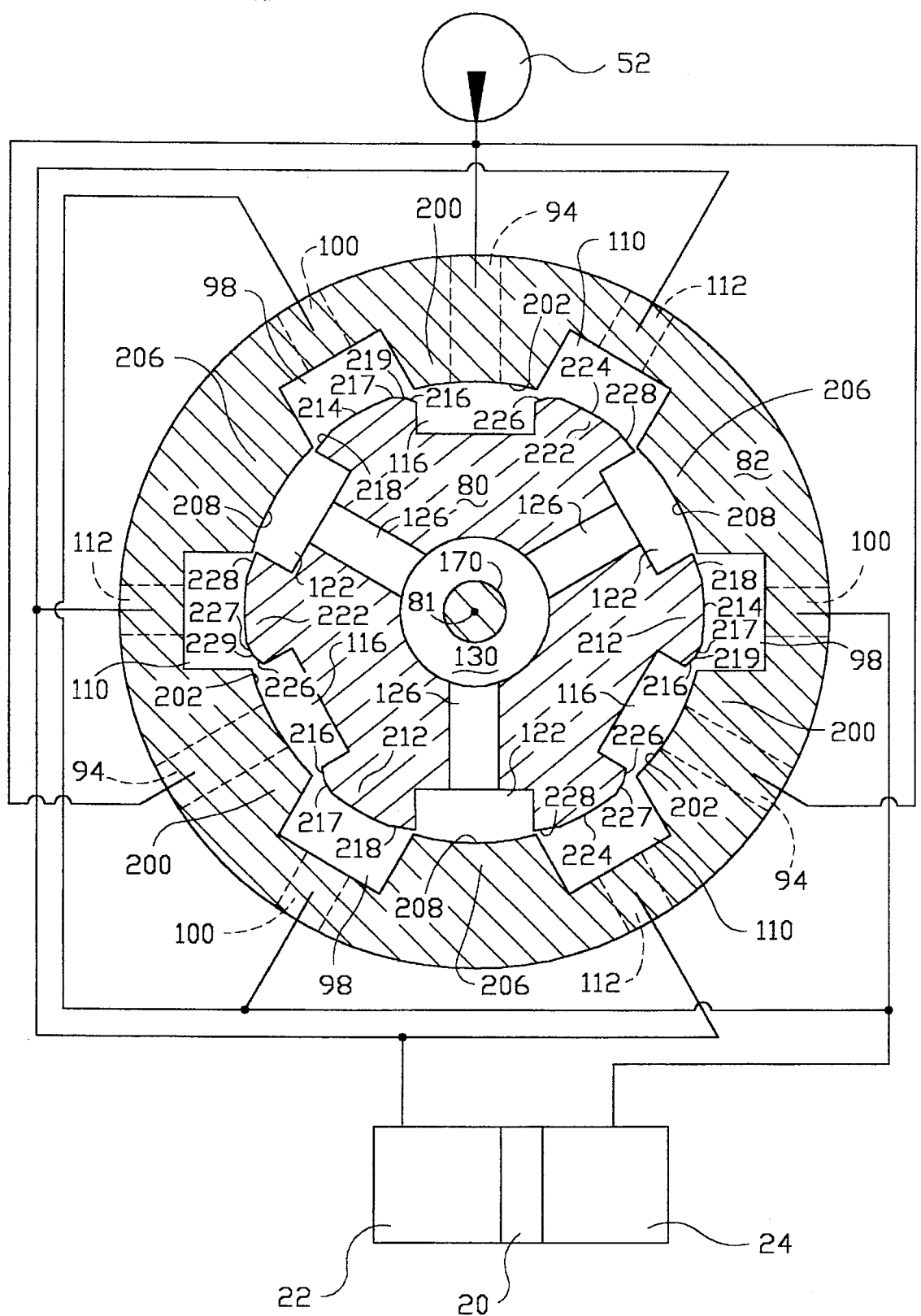
FIG. 2 is a schematic view including a cross-sectional illustration of a portion of the valve taken approximately along line 2—2 of FIG. 1.

The control valve 10 includes a valve core 80 and a hollow valve sleeve 82. The valve core 80 is located coaxially within the valve sleeve 82 and is rotatable relative to the valve sleeve 82 about a common axis 81 (FIG. 2). The valve sleeve 82 (FIG. 1) is supported for rotation by bearings 83 and 84. The bearing 83 is located between an annular projecting portion 85 of the valve sleeve 82 and a radial wall 86 of the housing 14. Also, a seal ring 87 is located between the outer surface of the valve sleeve 82 and the housing 14.

The bearing 84 is a thrust bearing and is located between a radial surface 88 of the annular projecting portion 85 of the valve sleeve 82 and a retaining nut 89. The nut 89 is threaded into the housing 14 and holds the control valve 10 within the housing 14. A seal ring 90 is located between the nut 89 and an outer surface of the valve sleeve 82. Another seal 91 is disposed in a groove in the housing 14.

The valve sleeve 82 (FIG. 2) has three radially directed passages 94 extending from its outer periphery to its inner periphery. The passages 94 are spaced 120° apart 10 about the valve sleeve 82. The passages 94 communicate with an annulus 96 (FIG. 1) in the housing 14. The annulus 96, in turn, is connected with the inlet port 46, and is thus subjected to the fluid pressure from the pump 52.

The valve sleeve 82 has three axially extending grooves 98 (FIG. 2) which are equally spaced around the inner periphery of the valve sleeve 82. Each of the grooves 98 communicate with a respective radially extending passage 100. The passages 100 are spaced 120° apart about the valve sleeve 82. The passages 100 (FIG. 1 shows only one passage 100, in phantom) communicate with an annulus 102 in the housing 14. The annulus 102 communicates with a housing passage 106 (shown schematically) which, in turn, communicates with the chamber portion 24.

The valve sleeve 82 (FIG. 2) includes three axially extending grooves 110 which are equally spaced about the inner periphery thereof. Each of the grooves 110 communicate with a respective passage 112. The passages 112 are spaced 120° apart about the valve sleeve 82. The passages 112 (FIG. 1 shows only one passage 112, in phantom) communicate with the chamber portion 22.

The valve core 80 has an elongated cylindrical configuration and is integrally formed as one piece with the shaft 62. The valve core 80 has three axially extending grooves 116 (FIG. 2) in its outer periphery. The grooves 116 are equally spaced 120° apart about the outer periphery of the valve core 80 and are in direct fluid communication with the passages 94 in the valve sleeve 82. The extent of the grooves 116 around the outer periphery of the valve core 80 is such that each of the grooves 116 communicates equally with respective grooves 98 and 110 when the valve core 80 is in a centered or neutral position relative to the valve sleeve 82 (as shown in FIG. 2).

Also equally spaced about the outer periphery of the valve core 80 are axially extending grooves 122. The extent of the grooves 122 around the outer circumference of the valve core 80 is such that each of the grooves 122 communicates equally with respective grooves 98 and 110 when the valve core 80 is in the centered or neutral position. Each of the grooves 122 is directly connected with a respective passage 126 which extends from each groove 122 into an internal passage 130 of the valve core 80. The internal passage 130 of the valve core 80 is connected with a plurality (four) of radially extending passages 134 (FIG. 1, only two shown) which extend through the valve core 80. The radially extending passages 134 communicate with an annulus 136 in the housing 14. The annulus 136, in turn, communicates with the return port 50 in the housing 14.

The valve sleeve 82 of the steering gear 10 is integrally formed with a follow-up member 150 which has a screw thread portion 152 formed in its outer periphery. The valve sleeve 82 and the follow-up member 150 form an integral one-piece unit 158. A plurality of balls 162 are located in the screw thread portion 152. The balls 162 are also located in an internally threaded portion 164 formed in a bore 166 of the piston 20.

Axial movement of the piston 20 corresponds to rotation of the follow-up member 150 and vice versa. A torsion spring 170 is connected between the input shaft 62 and the follow-up member 150 by pins 174 and 176, respectively. During a power assisted steering maneuver, the valve core 80 is rotated relative to the valve sleeve 82, away from the neutral position. Thus, when the valve core 80 is rotated relative to the valve sleeve 82, the piston 20 moves axially. When the steering maneuver is terminated, the one-piece unit 158, and thus the valve sleeve 82, will rotate relative to the valve core 80 and return to the neutral position via the bias of the torsion spring 170.

Control flow path structure of the preferred embodiment of the valve core 80 and the valve sleeve 82 is hereafter described. The valve sleeve 82 includes three axially extending lands 200 (FIG. 2) located radially opposite, in the neutral position, the grooves 116 of the valve core 80. The lands 200 each include an axially extending end face surface 202 which lies in an arc extending across the respective land 200 at a radius from the common axis 81. The lands 200 have relatively sharp terminus edges at the ends of the end face surfaces 202 adjacent the grooves 98 and 110, which define land corners. An associated one of the passages 94 extends through each land 200 and through each end face surface 202 to communicate with a respective one of the grooves 116.

The valve sleeve 82 also includes three axially extending lands 206 located radially opposite, in the neutral position, the grooves 122 of the valve core 80. The lands 206 each include an axially extending end face surface 208 which lies in an arc extending across the respective land 206 at a radius from the common axis 81. The lands 206 have relatively sharp terminus edges at the ends of the end face surfaces 208 adjacent the grooves 98 and 110, which define land corners.

The valve core 80 includes three axially extending lands 212 which are located radially opposite the grooves 98 in the neutral position. Each of the lands 212 has an axially extending end face surface 214 which lies in an arc extending partially across the respective land 212 at a radius from the common axis 81. Each of the lands 212 includes axially extending contoured portions 216, 217 and 218.

For each land 212, the contoured portions 216 and 217 are adjacent to each other at one side of the land 212. Each respective contoured portion 216 is located adjacent to a respective one of the grooves 116, and each respective contoured portion 217 is located between the adjacent contoured portion 216 and the respective one of the end face surfaces 214. Fluid flows past the three sets of contoured portions 216 and 217 in fluid parallel relative to each other.

Also for each land 212, the contoured portion 218 is located on the side of the land 212 opposite to the contoured portions 216 and 217. Each of the contoured portions 218 is located between a respective one of the grooves 122 and a respective one of the end face surfaces 214. The flows of fluid past the three contoured portions 218 are in fluid parallel with respect to each other.

In a preferred embodiment, the contoured portions 216, 217 and 218 are chamfers defined by planar surfaces. In alternative embodiments, the contoured portions 216, 217 and 218 may include a plurality of planar surfaces and/or one or more curved segments. Hereinafter, the contoured portions 216 and 218 are referred to as chamfers 216, 217 and 218, respectively, with the understanding that other contours are possible.

Figure 4:
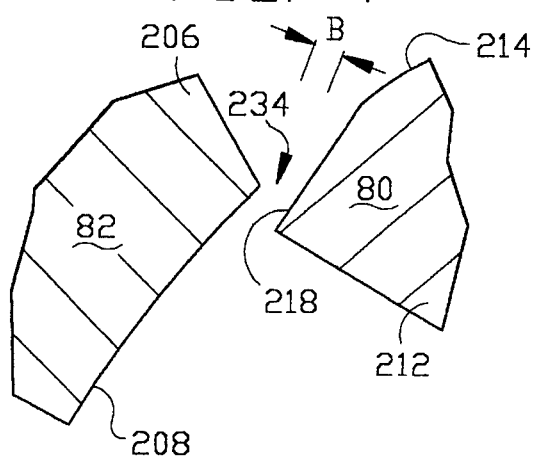
FIG. 4 is an enlargement of a portion of FIG. 3 with parts in a first relative position.

Each of the chamfers 217 tapers radially inwardly as it extends from the respective end face surface 214 to the respective chamber 216. Each of the chamfers 216 also tapers radially inward as it extends from the respective chamfer 217 to the groove 116. Each chamfer 216 is inclined relative to the respective chamfer 217, and thus, has a steeper gradient than the respective chamfer 217. A land corner is defined at the terminus edge of each chamfer 216 at the adjacent groove 116. An intersection corner 219 is also defined where the respective chamfers 216 and 217 intersect. These intersection corners 219 may be relatively sharp or, in the alternate embodiment, may be rounded. Each chamfer 218 (enlarged, FIG. 4) tapers radially inwardly as it extends from the respective end face surface 214 to the respective groove 122 and defines a land corner at its terminus edge adjacent to the groove 122. The chamfers 218 (FIG. 2) have a steeper gradient than the chamfers 217 and have a lesser gradient than the chamfers 216. This is shown by the overlays of the profiles of the chamfers 216, 217 and 218 in FIG. 10.

The valve core 80 also includes three axially extending lands 222 which are positioned radially opposite the grooves 110 in the neutral position. Each of the lands 222 has an axially extending end face surface 224 which lies in an arc extending partially across the respective land 222 at a radius from the common axis 81. Each of the lands 222 includes axially extending contoured portions 226, 227 and 228.

For each land 222, the contoured portions 226 and 227 are adjacent to each other at one side of the land 222. Each respective contoured portion 226 is located adjacent to a respective one of the grooves 116, and each respective contoured portion 227 is located between the adjacent contoured portion 226 and the respective one of the end face surfaces 224. Fluid flows past the three sets of contoured portions 226 and 227 in fluid parallel relative to each other.

Also for each land 222, the contoured portion 228 is located on the side of the land 222 opposite to the contoured portions 226 and 227. Each of the contoured portions 228 is located between a respective one of the grooves 122 and a respective one of the end face surfaces 224. The flows of fluid past the three contoured portions 228 are in fluid parallel relative to each other.

In the preferred embodiment, the contoured portions 226, 227 and 228 are chamfers defined by planar surfaces. In the alternative embodiment, the contoured portions 226, 227 and 228 may include a plurality of planar and/or one or more curved segments. Hereinafter, the contoured portions 226, 227 and 228 are referred to as chamfers 226, 227 and 228, respectively, with the understanding that other contours are possible.

Figure 5:
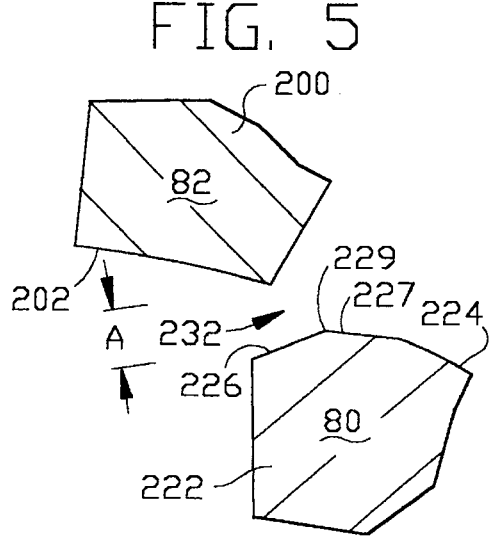
FIG. 5 is an enlargement of another portion of FIG. 3 with parts in the first relative position.

Each of the chamfers 227 (enlarged, FIG. 5) tapers radially inwardly as it extends from the respective end face surface 224 to the respective chamfer 226. Each of the chamfers 226 also tapers radially inward as it extends from the respective chamfer 227 to the groove 116. Each chamfer 226 is inclined relative to the respective chamfer 227, and thus, has a steeper gradient than the respective chamfer 227. A land corner is defined at the terminus edge of each chamfer 226 at the adjacent groove 116. An intersection corner 229 is also defined where the respective chamfers 226 and 227 intersect. These intersection corners 229 may be relatively sharp or, in the alternative embodiment, may be rounded. Each chamfer 228 (FIG. 2) tapers radially inward as it extends from the respective end face surface 224 to the respective groove 122 and defines a land corner at its terminus edge adjacent to the groove 122. The chamfers 228 have a steeper gradient than the chamfers 227 and have a lesser gradient than the chamfers 226. The gradients of the chamfers 216 and 226 are the same, the gradients of the chamfers 217 and 227 are the same, and the gradients of the chamfers 218 and 228 are the same.

Figure 11:
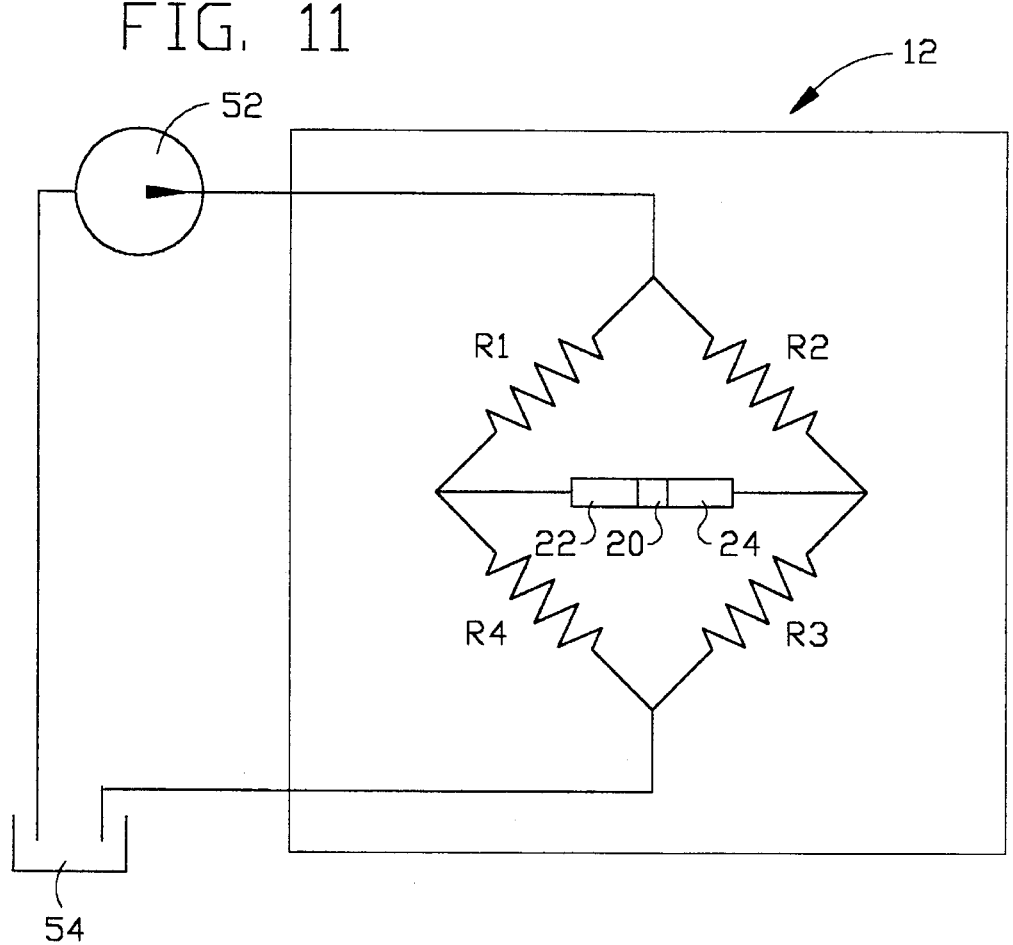
FIG. 11 is a schematic flow diagram of the valve of FIG. 1.

In operation, the amount of fluid flow from the grooves 116 to either the grooves 98 or 110 is dependent upon the proximity of the lands 212 and the lands 222 to the lands 200, due to relative rotation between the valve core 80 and the valve sleeve 82. The cooperation of the lands 200 and the lands 212 provides a variable resistance R1 (schematically represented in FIG. 11) to fluid flow, and the cooperation of the lands 200 and the lands 222 provides a variable resistance R2 to fluid flow. An increased resistance to fluid flow decreases a fluid volume flow rate.

Further, the amount of fluid flow from either the grooves 98 or 110 (FIG. 2) to the grooves 122 is dependent upon the proximity of the lands 212 and the lands 222 to the lands 206, due to relative rotation between the valve core 80 to the valve sleeve 82. The cooperation of the lands 206 and the lands 222 provides a variable resistance R3 (FIG. 11) to fluid flow and the cooperation of the lands 206 and the lands 212 provides a variable resistance R4 to fluid flow. Associated with each of the resistances R1–R4 is a pressure change (drop) as the flowing fluid crosses the area of resistance and is subjected to the resistance. The amount of pressure drop is proportional to the amount of resistance.

In the neutral position (FIG. 2) the lands 212 and the lands 222 are spaced at equal distances from the lands 200. Equal amounts of pressurized hydraulic fluid flows from the grooves 116 into both the grooves 98 and the grooves 110. Also, in the neutral position, the lands 212 and the lands 222 are spaced at equal distances from the lands 206. Equal amounts of hydraulic fluid flows from the grooves 98 and 110 into the grooves 122. Thus, in the neutral position, the pressures in the chamber portions 22 and 24 are equal. Therefore, the piston 20 is not moved.

Figure 3:
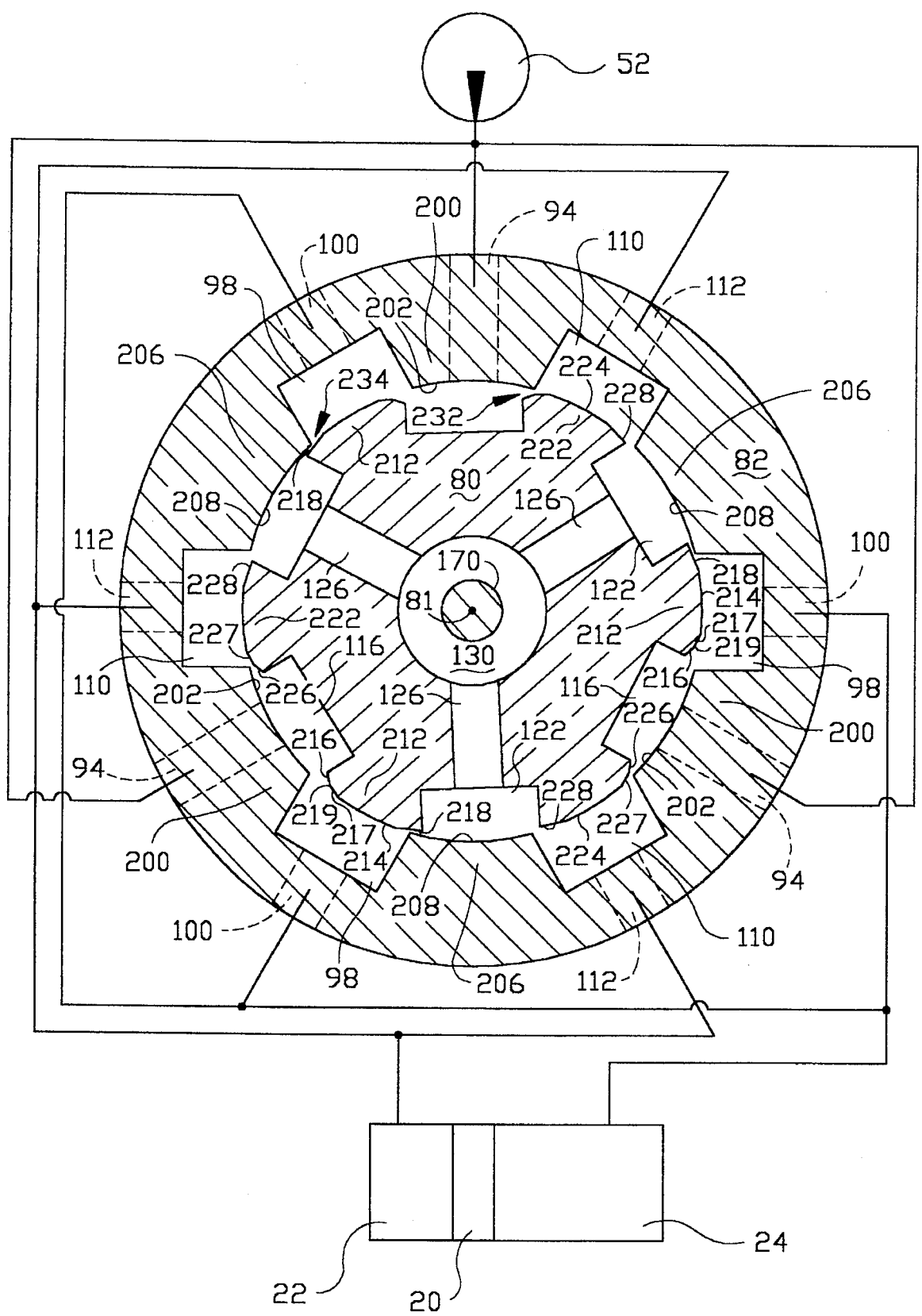
FIG. 3 is a view generally similar to FIG. 2, showing the valve members relatively rotated.

Upon rotation of the steering wheel for a power assisted steering maneuver, the valve core 80 is rotated relative to the valve sleeve 82, away from the neutral position. Upon rotation of the valve core 80 in a first direction (counter-clockwise as shown in FIG. 3) relative to the valve sleeve 82, the lands 212 are spaced a greater distance from the lands 200 and the lands 222 are spaced a greater distance from the lands 206 than in the neutral position. The spacing of the lands 212 relative to the lands 200 and the spacing of the lands 222 relative to the lands 206 increases the respective areas available for fluid flow and reduces the respective resistance R1 and R3 (FIG. 11) to increase the flow of hydraulic fluid. Pressurized hydraulic fluid from the pump 52 is directed into the chamber 24. Also, hydraulic fluid from the chamber 22 is vented to the reservoir 54 to move the piston 20.

As the valve core 80 (FIG. 3) is rotated relative to the valve sleeve 82 through a range of rotation away from the neutral position, the lands 212 partially radially overlap the lands 206 and the lands 222 partially radially overlap the lands 200. The overlapping lands 222 and 200 define restrictive flow gaps or passages 232 for hydraulic fluid flowing from the grooves 116 to the grooves 110. The overlapping lands 212 and 206 create restrictive flow gaps or passages 234 for hydraulic fluid flowing from the grooves 98 to the grooves 122.

Each flow gap 234 (enlarged, FIG. 4) has a cross-sectional area defined by the end face surface 208 on a respective one of the lands 206 and the chamfer 218 on a respective one of the lands 212. The cross-sectional area of each flow gap 234 for flow of hydraulic fluid from the grooves 98 to the grooves 122 gradually increases from a minimum cross-sectional area B immediately adjacent to the groove 98. Thus, the flow gaps 234 are termed divergent flow gaps. During the radial overlap, the minimum cross-sectional area B of each flow gap 234 is defined by the terminus edge of the end face surface 208 and the chamfered portion 218.

Each flow gap 232 (enlarged, FIG. 5) has a cross-sectional area. Depending upon the amount of radial overlap, each respective cross-sectional area is defined between the end face surface 202 of a respective one of the lands 200 and the chamfer 226 on a respective one of the lands 222 or is defined between the respective end face surface 202 and the respective chamfers 226 and 227. The cross-sectional area of each flow gap 232 for flow of hydraulic fluid from the grooves 116 to the grooves 110 decreases to a minimum cross-sectional area A immediately adjacent to the groove 110. Thus, the flow gaps 232 are termed convergent flow gaps. Depending upon the amount of the radial overlap, the minimum cross-sectional area A is defined by the terminus edge of the end face surface 202 and either the chamfer 226 or the chamfer 227.

The sizes of the minimum cross-sectional areas A and B, and thus the amount of the resistances R2 and R4, are related to the amount of relative rotation of the valve core 80 from the neutral position. An increase in the amount of rotation away from the neutral position decreases the minimum cross-sectional areas A and B, and increases the resistances R2 and R4.

For a first segment of relative rotation of the valve core 80 and the valve sleeve 82 (FIGS. 4 and 5), only the chamfers 226 overlap the respective end face surfaces 202 at the flow gaps 232. The minimum cross-sectional areas A at the flow gaps 232 are defined at the respective chamfers 226 and the minimum cross-sectional areas B at the flow gaps 234 are defined at the respective chamfer 218. The minimum cross-sectional area A (FIG. 5) at each flow gap 232 is larger than the minimum cross-sectional area B (FIG. 4) at each flow gap 234 because the gradient of the chamfers 226 is greater than the gradient of the chamfers 218. The resistance R2 is less than the resistance R4. The fluid volume flow rate through the flow gap 234 is less than the fluid volume flow rate through the flow gap 232.

However, both of the resistances R2 and R4 are not yet very large compared to their respective values which will be achieved upon further rotation of the valve spool 80 relative to the valve sleeve 82. Thus, the pressure drops at the flow gaps 232 and 234 are not yet very large. Less overall flow noise is created because the larger minimum cross-sectional area A is at a convergent flow gap and the smaller minimum cross-sectional area B is at a divergent flow gap for this relatively low pressure drop situation.

As the valve core 80 is further rotated relative to the valve sleeve 82, away from the neutral position and past the first segment of relative rotation, both the minimum cross-sectional flow areas A and B continue to decrease. However, the minimum cross-sectional areas A decrease at a faster rate than the minimum cross-sectional areas B because of the larger gradient of the chamfers 226. At a particular rotational position of the valve core 80 and the valve sleeve 82, the minimum cross-sectional areas A and B are equal. The resistances R2 and R4 are equal, and the fluid volume flow rates through the flow gaps 232 and 234 are equal.

Figure 6:
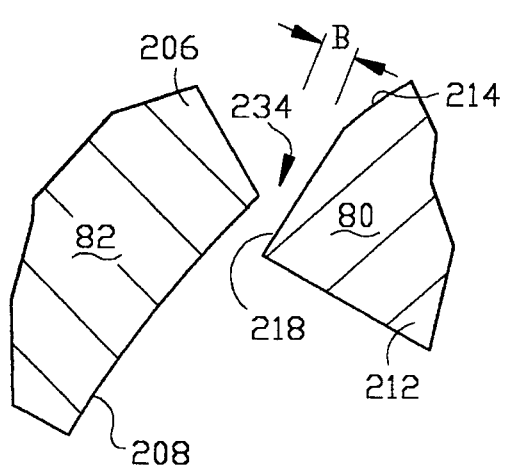
FIG. 6 is a view similar to FIG. 4 with the parts in a different relative position.
Figure 7:
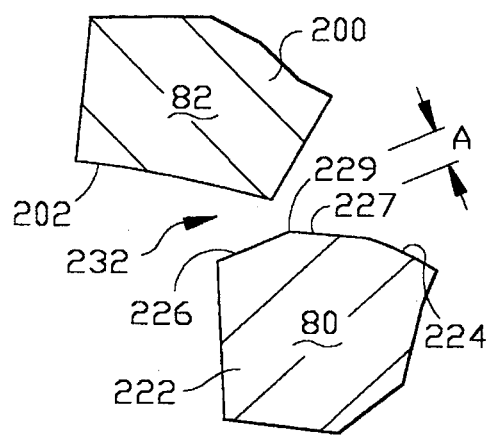
FIG. 7 is a view similar to FIG. 5 with the parts in the different relative position.
Figure 8:
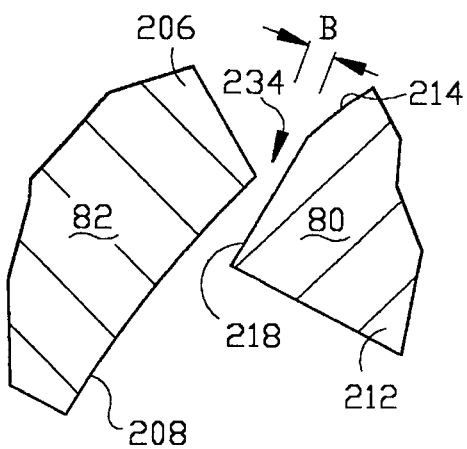
FIG. 8 is a view similar to FIG. 4 with the parts in yet another different relative position.
Figure 9:
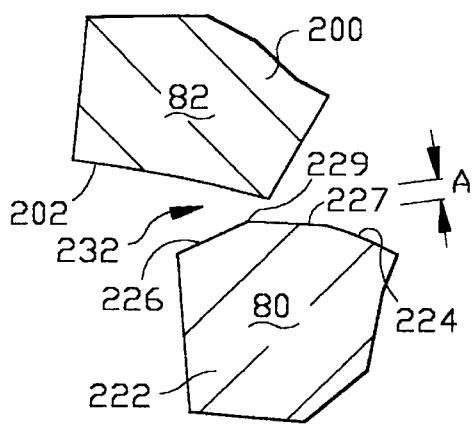
FIG. 9 is a view similar to FIG. 5 with the parts in the other different relative position.

The rotational position at which the minimum cross-sectional areas A and B are equal is dependent upon the contouring of the lands. Specifically, in the embodiment shown in the Figures, this equal flow position is dependent upon the size of the respective gradients of the chamfers 216, 217 and 218, and the relative lengths of the chamfers 216, 217 and 218 along their respective lands. In the preferred embodiment, this equal flow position (FIGS. 6 and 7) occurs prior to the terminus edge of each respective end face surface 202 being radially aligned with the respective intersection corner 229 during the rotation of the valve core 80 relative to the valve sleeve 82 away from the neutral position.

Figure 10:
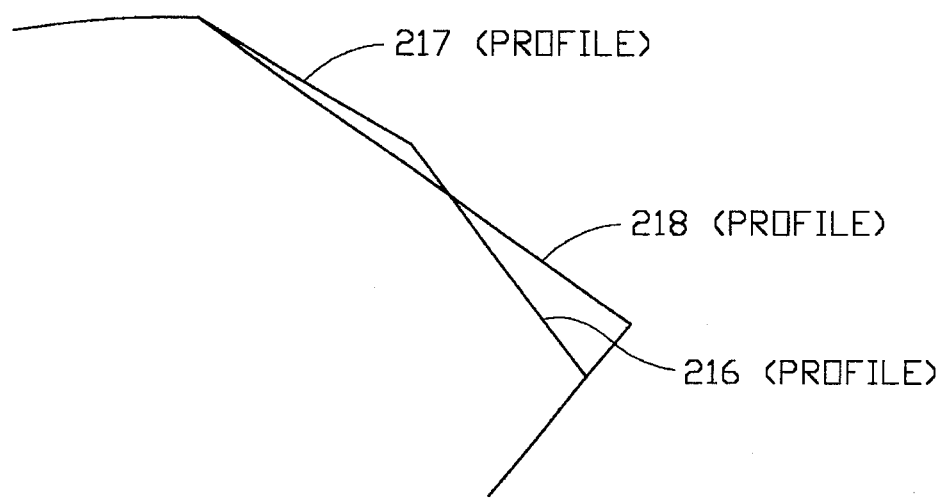
FIG. 10 is a view of a schematic overlay of two geometric representations of surface profiles of the valve of FIG. 1.

This can be further understood upon consideration of FIG. 10 in which the profiles of the chamfers 216 and 217 are overlaid on the profile of the chamfer 218. The intersection of the profile of the chamfer 218 with the profile of the chamfer 216 indicates a location along the respective chamfers at which a minimum cross-sectional flow area will be defined at the equal flow position.

Upon further continued rotation of the valve core 80 and the valve sleeve 82 away from the neutral position and away from the equal flow position, the minimum cross-sectional areas A and B continue to decrease. However, the minimum cross-sectional flow area A at each flow gap 232 remains smaller than the minimum cross-sectional flow areas B at each flow gap 234. The resistance R4 is less than the resistance R2 and the fluid volume flow rate through the flow gap 232 is less than the fluid volume flow rate through the flow gap 234.

Further, the flow gaps 232 and 234 are very pinched and the resistances R2 and R4 are very large compared to their respective values when the valve core 80 is rotated only slightly from the neutral position relative to the valve sleeve 82. Thus, the pressure drops at the flow gaps 232 and 234 are relatively large for these relatively greatly rotated positions of the valve core 80 relative to the valve sleeve 82. Less overall noise is created because the larger minimum cross-sectional area B is at a divergent flow gap and the smaller minimum cross-sectional flow area A is at a convergent flow gap for this relatively high pressure drop situation. Thus, the present invention provides improved suppression of noise at both the relatively low pressure drop situation and the relatively high pressure drop situation.

Upon rotation of the valve core 80 (FIG. 2) in a second direction (clockwise, not shown) relative to the valve sleeve 82, there is a corollary restriction of flow of hydraulic fluid from the grooves 116 to the grooves 98 and from the grooves 110 to the grooves 122. With the valve core 80 and the valve sleeve 82 relatively rotated in such a manner, the lands 222 radially overlap the lands 206 and the lands 212 radially overlap the lands 200. Thus, associated restrictive flow gaps are established between the lands 222 and 206 and the lands 212 and 200.

Thus, pressurized hydraulic fluid from the pump 52 (FIG. 1) is directed into the chamber 22. Hydraulic fluid from the chamber 24 is vented to the reservoir 54. However, here also, the minimum cross-sectional area at the convergent flow gaps is larger than the minimum cross-sectional area at the divergent flow gap, during a first segment of relative rotation of the valve core 80 away from the neutral position. The fluid volume flow rate is larger at the convergent flow gaps, and less overall noise is created for this relatively low pressure drop situation.

At a segment of greater relative rotation of the valve core 80 away from the neutral position and beyond the first segment of relative rotation, the relative size ratios reverse. The minimum cross-sectional area at the divergent flow gaps is larger than the minimum cross-sectional flow area at the convergent flow gaps. The fluid volume flow rate is larger at the divergent flow gaps, and less noise is created for this relatively high pressure drop situation.

From the above description of the invention, those skilled in the art will perceive improvements, changes and modifications. For example, the lands may be contoured such that only divergent or only convergent flow gaps are created upon relative rotation of the valve core and the valve sleeve. During relative rotation away from the neutral position, the minimum cross-sectional flow area at one or more flow gaps would be greater than the minimum cross-sectional flow area at one or more flow gaps at a first position or range, and would be less at a second position or range, for noise suppression. Alternatively, the fluid flow may be reduced by a greater amount in one or more flow gaps than the amount of reduction in one or more other flow gaps, thus changing the relative percentage of the total flow which is permitted in each of the flow gaps. Also, for example, the lands may be contoured such that the shift from a greater relative size to a lesser relative size may be from a divergent flow gap(s) to a convergent flow gap(s). Such improvements, changes and modifications within the skill of the art are intended to be covered by the appended claims.

Having described the invention, the following is claimed:

1. A valve for controlling flow of hydraulic fluid, said valve comprising:

inlet port means for connection with a fluid supply;

return port means for connection with a fluid reservoir;

first and second device port means for connection with first and second locations in a fluid utilization device, respectively;

first and second relatively movable valve members, each valve member having a plurality of lands and grooves;

respective pairs of said lands having surface segments which overlap and form flow gaps for restricting flow of fluid between respective pairs of grooves at relative positions of said valve members, said flow gaps including first and second flow gaps; and one of said first and second flow gaps being located between a groove in direct fluid communication with said inlet port means and a groove in direct fluid communication with said first device port means, the other of said first and second flow gaps being located between a groove in direct fluid communication with said second device port means and a groove in direct fluid communication with said return port means, each of said flow gaps having a minimum cross-sectional flow area defined by said surface segments, said minimum cross-sectional flow area of said first flow gap being larger than said minimum cross-sectional flow area of said second flow gap at a first relative position of said valve members and said minimum cross-sectional flow area of said first flow gap being smaller than said minimum cross-sectional flow area of said second flow gap at a second relative position of said valve members.

2. A valve as set forth in claim 1, wherein said first flow gap is convergent by having a cross-sectional flow area which decreases along the direction of fluid flow therethrough, said second flow gap is divergent by having a cross-sectional flow area which increases along the direction of flow therethrough.

3. A valve as set forth in claim 1, wherein said surface segments which form said first flow gap include first and second contoured segments on one of said valve members, said second contoured segment being inclined with respect to said first contoured segment.

4. A valve as set forth in claim 1, wherein said surface segments are contoured for defining said first and second flow gaps such that said minimum cross-sectional flow area of said first flow gap is larger than said minimum cross-sectional flow area of said second flow gap through a first range of relative positions of said valve members away from a neutral position, the first range of relative positions including the first relative position of the valve members, said surface segments are contoured for defining said first and second flow gaps such that said minimum cross-sectional flow area of said first flow gap is smaller than said minimum cross-sectional flow area of said second flow gap through a second range of relative positions of said valve members away from the neutral position, the second range of relative positions including the second relative position of the valve members.

5. A valve as set forth in claim 4, wherein the second range of relative positions is further from the neutral position than the first range of relative positions.

6. A valve as set forth in claim 4, wherein said surface segments are contoured for defining said first and second flow gaps such that said minimum cross-sectional flow areas of said first and second flow gaps are equal at a third relative position of said valve members, the third relative position being between the first and second ranges of relative positions of said valve members.

7. A valve as set forth in claim 1, wherein said first and second valve members comprise a valve core and a valve sleeve, respectively, said valve core being located within said valve sleeve and being rotatable relative to said valve sleeve, said first flow gap restricting a flow of fluid from a groove on said valve spool to a groove on said valve sleeve, said second flow gap restricting a flow of fluid from a groove on said valve sleeve to a groove on said valve core.

8. A valve for controlling flow of hydraulic fluid, said valve comprising:

first and second relatively movable valve members, each valve member having a plurality of lands and grooves;

respective pairs of said lands having surface segments which overlap and form flow gaps for restricting flow of fluid between respective pairs of grooves at relative positions of said valve members;

at least one of said flow gaps being divergent by having a cross-sectional flow area which increases along the direction of fluid flow therethrough and at least one of said flow gaps being convergent by having a cross-sectional flow area which decreases along the direction of fluid flow therethrough; and said divergent and convergent flow gaps having minimum cross-sectional flow areas defined by said surface segments, said minimum cross-sectional flow area of said convergent flow gap being larger than said minimum cross-sectional flow area of said divergent flow gap at a first relative position of said valve members and said minimum cross-sectional flow area of said convergent flow gap being smaller than said minimum cross-sectional flow area of said divergent flow gap at a second relative position of said valve members for suppressing valve noise.

9. A valve as set forth in claim 8, wherein said surface segments which form said convergent flow gap include first and second contoured segments on one of said valve members, said minimum cross-sectional flow area of said convergent flow gap being defined at said first contoured segment when said valve members are at the first relative position, said minimum cross-sectional flow area of said convergent flow gap being defined at said second contoured segment when said valve members are at the second relative position.

10. A valve as set forth in claim 9, wherein said first and second contoured segments are first and second planar surface segments, respectively, said first planar surface segment being inclined relative to said second planar surface segment.

11. A valve as set forth in claim 9, wherein said first contoured segment is located adjacent to one of said grooves of said one valve member, said second contoured segment is located adjacent to said first contoured segment and is spaced away from said one of said grooves of said one valve member.

12. A valve as set forth in claim 11, wherein said surface segments which form said divergent flow gap include a third contoured segment on said one of said valve members, said minimum cross-sectional flow area of said divergent flow gap being defined at said third contoured segment when said valve members are at both the first and second relative positions.

13. A valve as set forth in claim 12, wherein said third contoured segment is a planar surface segment.

14. A valve as set forth in claim 8, wherein said surface segments are contoured for defining said convergent and divergent flow gaps such that said minimum cross-sectional flow area of said convergent flow gap is larger than said minimum cross-sectional flow area of said divergent flow gap through a first range of relative positions of said valve members, the first range of relative positions including the first relative position of the valve members, and said surface segments are contoured for defining said convergent and divergent flow gaps such that said minimum cross-sectional flow area of said convergent flow gap is smaller than said minimum cross-sectional flow area of said divergent flow gap through a second range of relative positions of said valve members, the second range of relative positions including the second relative position of the valve members.

15. A valve as set forth in claim 14, wherein said surface segments are contoured for defining said convergent and divergent flow gaps such that said minimum cross-sectional flow areas of said convergent and divergent flow gaps are equal at a third relative position of said valve members, the third relative position being between the first and second ranges of relative positions of said valve members.

16. A valve as set forth in claim 15, wherein said surface segments which form said convergent flow gap include first and second contoured segments on one of said valve members, said minimum cross-sectional flow area of said convergent flow gap being defined at said first contoured segment when said valve members are at both first and third relative positions, said minimum cross-sectional flow area of said convergent flow gap being defined at said second contoured surface segment when said valve members are at the second relative position.

17. A valve as set forth in claim 16, wherein said surface segments are contoured for defining said convergent and divergent flow gaps such that a relatively low pressure drop occurs across said convergent and divergent flow gaps at the first relative position of said valve members and said surface segments are contoured for defining said convergent and divergent flow gaps such that a relatively high pressure drop occurs across said convergent and divergent flow gaps at the second relatively rotated position of said valve members.

18. A valve as set forth in claim 8, wherein said first and second valve members comprise a valve core and a valve sleeve, respectively, said valve core being located within said valve sleeve and being rotatable relative to said valve sleeve, said convergent flow gap restricting a flow of fluid from a groove on said valve spool to a groove on said valve sleeve, said divergent flow gap restricting a flow of fluid from a groove on said valve sleeve to a groove on said valve core.

19. A valve for controlling flow of hydraulic fluid, said valve comprising:

first and second relatively movable valve members, each valve member having a plurality of lands and grooves;

respective pairs of said lands having surface segments which overlap and form flow gaps for restricting flow of fluid between respective pairs of grooves at relative positions of said valve members;

at least one of said flow gaps being divergent by having a cross-sectional flow area which increases along the direction of fluid flow therethrough and at least one of said flow gaps being convergent by having a cross-sectional flow area which decreases along the direction of fluid flow therethrough; and said surface segments comprising means for enabling the fluid flow through said convergent flow gap to be greater than the fluid flow through said divergent flow gap at a first relative position of said valve members and for enabling the fluid flow through said convergent flow gap to be less than the fluid flow through said divergent flow gap at a second relative position of said valve members to suppress valve noise.

20. A valve as set forth in claim 19, wherein each of said convergent and divergent flow gaps have a minimum cross-sectional flow area, said minimum cross-sectional flow area of said convergent flow gap being larger than said minimum cross-sectional flow area of said divergent flow gap when said first and second valve members are at the first relative position, said minimum cross-sectional flow area of said convergent flow gap being smaller than said minimum cross-sectional flow area of said divergent flow gap when said first and second valve members are at the second relative position.

21. A valve as set forth in claim 20, wherein said surface segments include first and second contoured segments on one of said valve members, said minimum cross-sectional flow area of said convergent flow gap being defined at said first contoured segment when said valve members are at the first relative position, said minimum cross-sectional flow area of said convergent flow gap being defined at said second contoured segment when said valve members are at the second relative position.

22. A valve as set forth in claim 21, wherein said contoured segments include a third contoured segment on said one of said valve members, said minimum cross-sectional flow area of said divergent flow gap being defined at said third contoured segment when said valve members are at both the first and second relative positions.

23. A valve as set forth in claim 22, wherein said first, second and third contoured segments are first, second and third planar surfaces, respectively, said first planar surface segment being adjacent to and being inclined relative to said second planar surface segment.

24. A valve as set forth in claim 23, wherein said minimum cross-sectional flow area of said convergent flow gap is larger than said minimum cross-sectional flow area of said divergent flow gap through a first range of relative positions of said valve members and said minimum cross-sectional flow area of said convergent flow gap is smaller than said minimum cross-sectional flow area of said divergent flow gap through a second range of relative positions of said valve members, the first and second ranges of relative positions including the first and second relative positions of the valve members, respectively.

25. A valve as set forth in claim 24, wherein said minimum cross-sectional flow areas of said convergent and divergent flow gaps are equal at a third relative position of said valve members.

26. A valve as set forth in claim 25, wherein the third relative position of said valve members is between the first and second ranges of relative positions, said minimum cross-sectional flow area of said convergent flow gap being defined at said first planar surface when said valve members are at the third relative position.

27. A valve as set forth in claim 19, wherein said surface segments are contoured for defining said convergent and divergent flow gaps such that a relatively low pressure drop occurs across said convergent and divergent flow gaps at the first relative position of said valve members and said surface segments being contoured for defining said convergent and divergent flow gaps such that a relatively high pressure drop occurs across said convergent and divergent flow gaps at the second relative position of said valve members.

28. A valve for controlling flow of hydraulic fluid, said valve comprising:

first and second relatively movable valve members, each valve member having a plurality of lands and grooves;

respective pairs of said lands having surface segments which overlap and form flow gaps, at relative positions of said valve members away from a neutral position, for restricting flow of fluid between respective pairs of grooves, said flow gaps consisting of first and second flow gaps;

said surface segments comprising means for enabling a percentage of the fluid flow flowing through said first and second flow gaps which flows through said first flow gap at a first relative position of said valve members to be greater than a percentage of the fluid flow flowing through the first and second flow gaps which flows through said first flow gap at a second relative position of said valve members; and said surface segments being contoured for enabling the fluid flow through said first flow gap to be greater than the fluid flow through said second flow gap at the first relative position of said valve members and for enabling the fluid flow through said first flow gap to be less than the fluid flow through said second flow gap at the second position of said valve members.

29. A valve as set forth in claim 28, wherein said valve includes:

inlet port means for connection with a fluid supply, return port means for connection with a fluid reservoir, and first and second device port means for connection with first and second locations in a fluid utilization device, respectively;

one of said first and second flow gaps being located between a groove in direct fluid communication with said inlet port means and a groove in direct fluid communication with said first device port means, the other of said first and second flow gaps being located between a groove in direct fluid communication with said second device port means and a groove in direct fluid communication with said return port means.

30. A valve as set forth in claim 28, wherein said first flow gap is convergent by having a cross-sectional flow area which decreases along the direction of fluid flow therethrough, said second flow gap is divergent by having a cross-sectional flow area which increases along the direction of flow therethrough.

31. A valve as set forth in claim 30, wherein said surface segments which form said convergent flow gap include first and second contoured segments on one of said valve members, said second contoured segment being inclined with respect to said first contoured segment.

32. A valve for controlling flow of hydraulic fluid, said valve comprising:

first and second relatively movable valve members, each valve member having a plurality of lands and grooves;

respective pairs of said lands having surface segments which overlap and form flow gaps, at relative positions of said valve members away from a neutral position, for restricting flow of fluid between respective pairs of grooves, said flow gaps consisting of first and second flow gaps;

said surface segments comprising means for enabling a percentage of the fluid flow flowing through said first and second flow gaps which flows through said first flow gap at a first relative position of said valve members to be greater than a percentage of the fluid flow flowing through the first and second flow gaps which flows through said first flow gap at a second relative position of said valve members; and said first and second flow gaps having a minimum cross-sectional flow area, said minimum cross-sectional flow area of said first flow gap being larger than said minimum cross-sectional flow area of said second flow gap when said first and second valve members are at the first relative position, said minimum cross-sectional flow area of said first flow gap being smaller than said minimum cross-sectional flow area of said second flow gap when said first and second valve members are at the second relative position.

33. A valve as set forth in claim 28, wherein said first flow gap is convergent by having a cross-sectional flow area which decreases along the direction of fluid flow therethrough, said second flow gap is divergent by having a cross-sectional flow area which increases along the direction of flow therethrough.

34. A valve as set forth in claim 32, wherein the second relative position is further from the neutral position than the first relative position.

35. A valve as set forth in claim 32, wherein said first and second valve members comprise a valve core and a valve sleeve, respectively, said valve core being located within said valve sleeve and being rotatable relative to said valve sleeve, said first flow gap restricting a flow of fluid from a groove on said valve spool to a groove on said valve sleeve, said second flow gap restricting a flow of fluid from a groove on said valve sleeve to a groove on said valve core.

* * * * *